United States Patent [19]

Roantree et al.

[11] 4,062,004
[45] Dec. 6, 1977

[54] DUAL RANGE, TORQUE REBALANCING OF INERTIAL SENSOR

[75] Inventors: James P. Roantree, West Hartford; Glenn A. Swartzentruber, Simsbury, both of Conn.

[73] Assignee: United Technologies Corporation, Hartford, Conn.

[21] Appl. No.: 663,175

[22] Filed: Mar. 2, 1976

[51] Int. Cl.[2] .......................................... G08C 19/02
[52] U.S. Cl. .................................. 340/187; 318/590; 318/648
[58] Field of Search .................. 340/186, 187, 317; 318/617, 590, 592, 648, 649; 73/178 R, 514; 244/79

[56] References Cited

U.S. PATENT DOCUMENTS

| 3,241,015 | 3/1966 | Allen | 318/617 |
| 3,286,245 | 11/1966 | Cozart | 340/187 |
| 3,431,474 | 3/1969 | Ostrand | 318/592 |
| 3,702,732 | 11/1972 | Sliwkowski | 318/592 |
| 3,749,997 | 7/1973 | Cohen et al. | 318/592 |

OTHER PUBLICATIONS

*Control Engineering*, "Dual Mode Servo Compensation", Gehmlich, pp. 119-123.

*Primary Examiner*—John W. Caldwell
*Assistant Examiner*—James J. Groody
*Attorney, Agent, or Firm*—M. P. Williams

[57] ABSTRACT

The pulse torque rebalancing feedback applied to a gyro, or other inertial sensor, is selected to be a low current for low angular rates (or other outputs) and is selected to be a high current, such as eight times greater than the low current, for high angular rates. Digital integration in an up/down counter is similarly controlled by a low frequency clock for low angular rates and a high frequency clock (which is eight times greater) for high angular rates. Mode switching includes hysteresis and time delay. The sensor outputs are compared against a ramp, the first half of the ramp being negative and the second half being positive, early in the first half being high rates and late in the second half being high rates; high and low outputs are sensed by comparing against strobe signals, a high rate strobe appearing very late in the cycle, and a low rate strobe appearing near the center of the cycle; rates sensed within either strobe causes the mode to shift (from high to low or vice versa).

7 Claims, 7 Drawing Figures

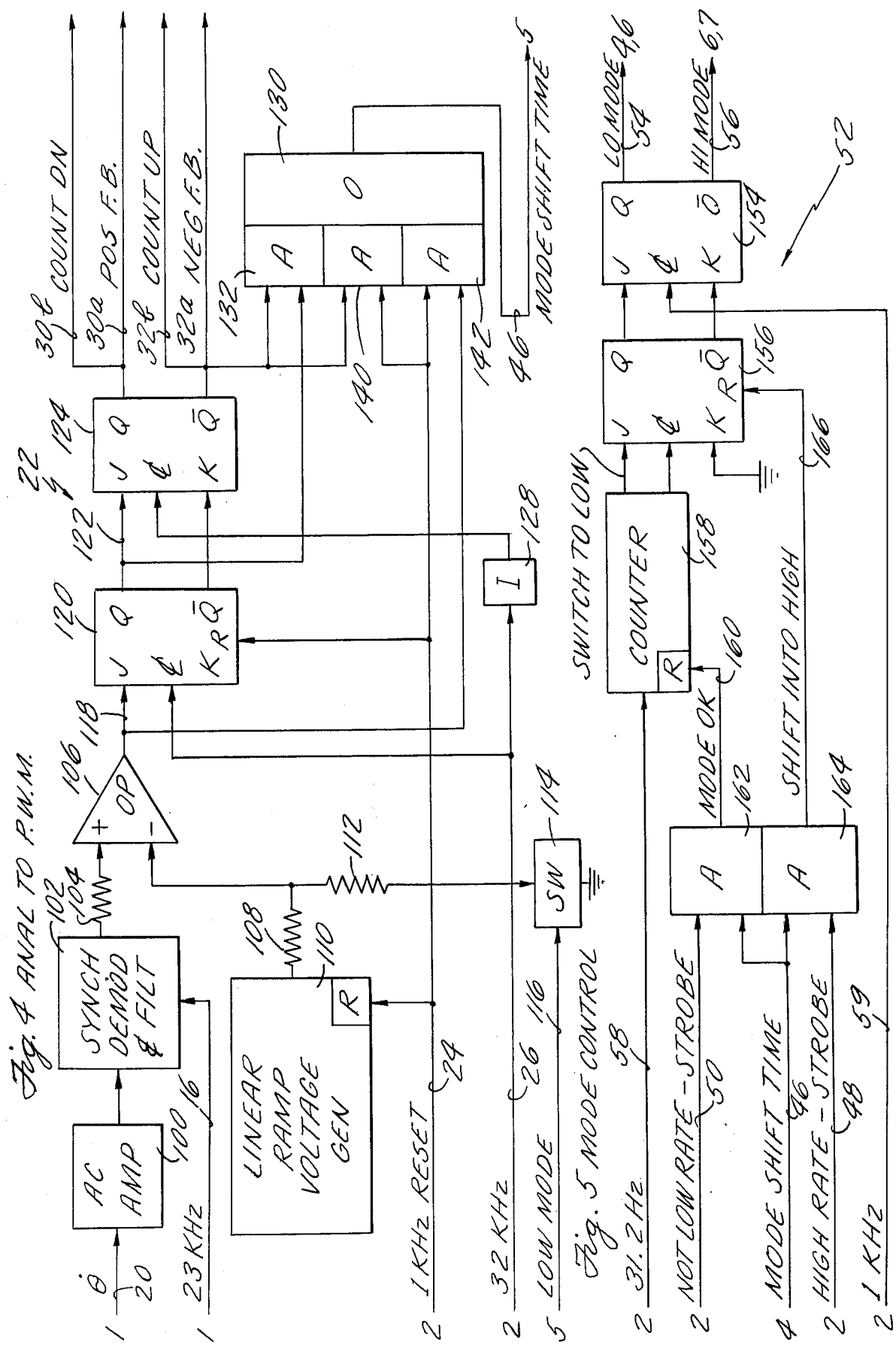

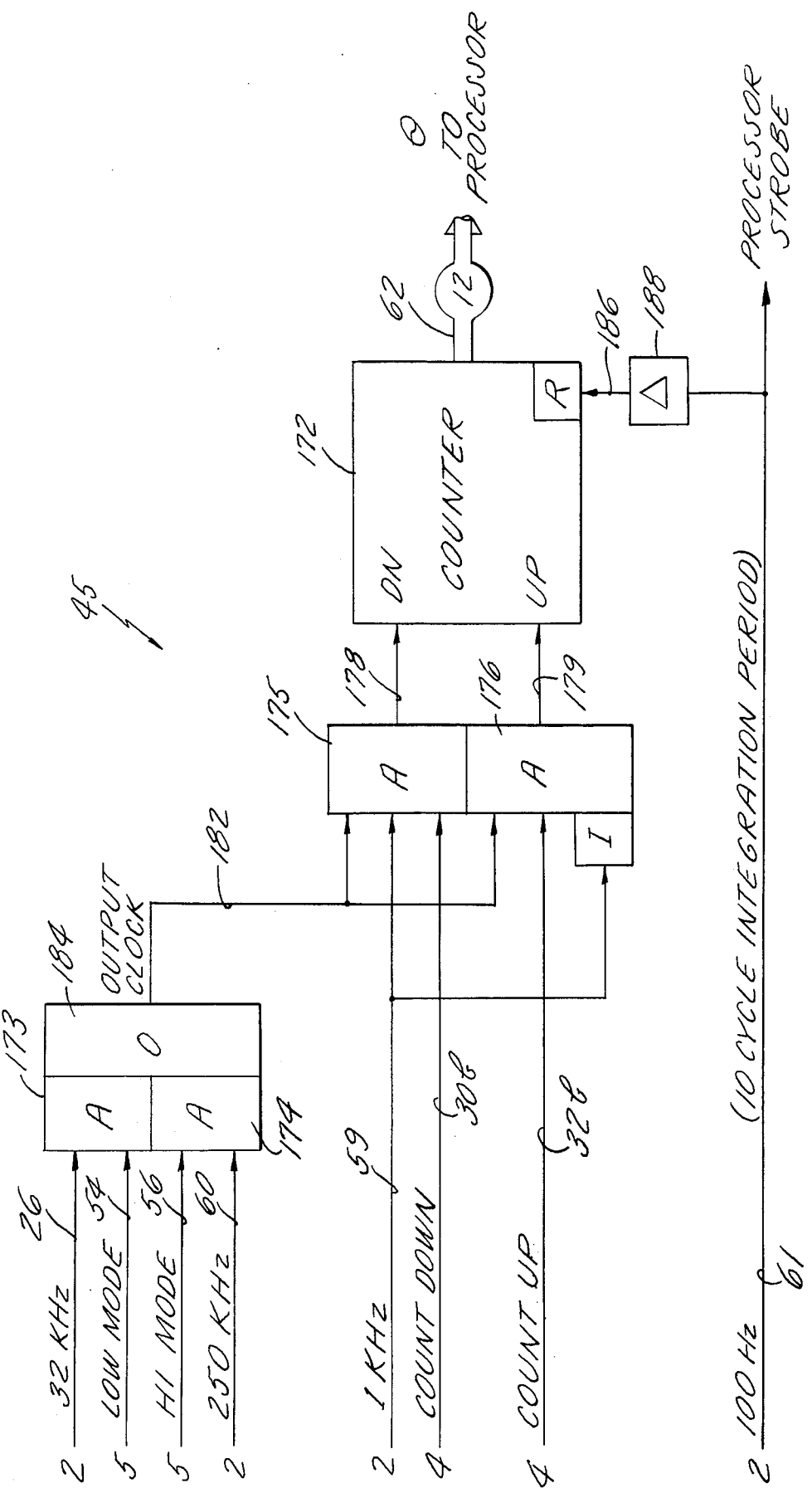
Fig. 6 OUTPUT COUNTER (INTGRTR)

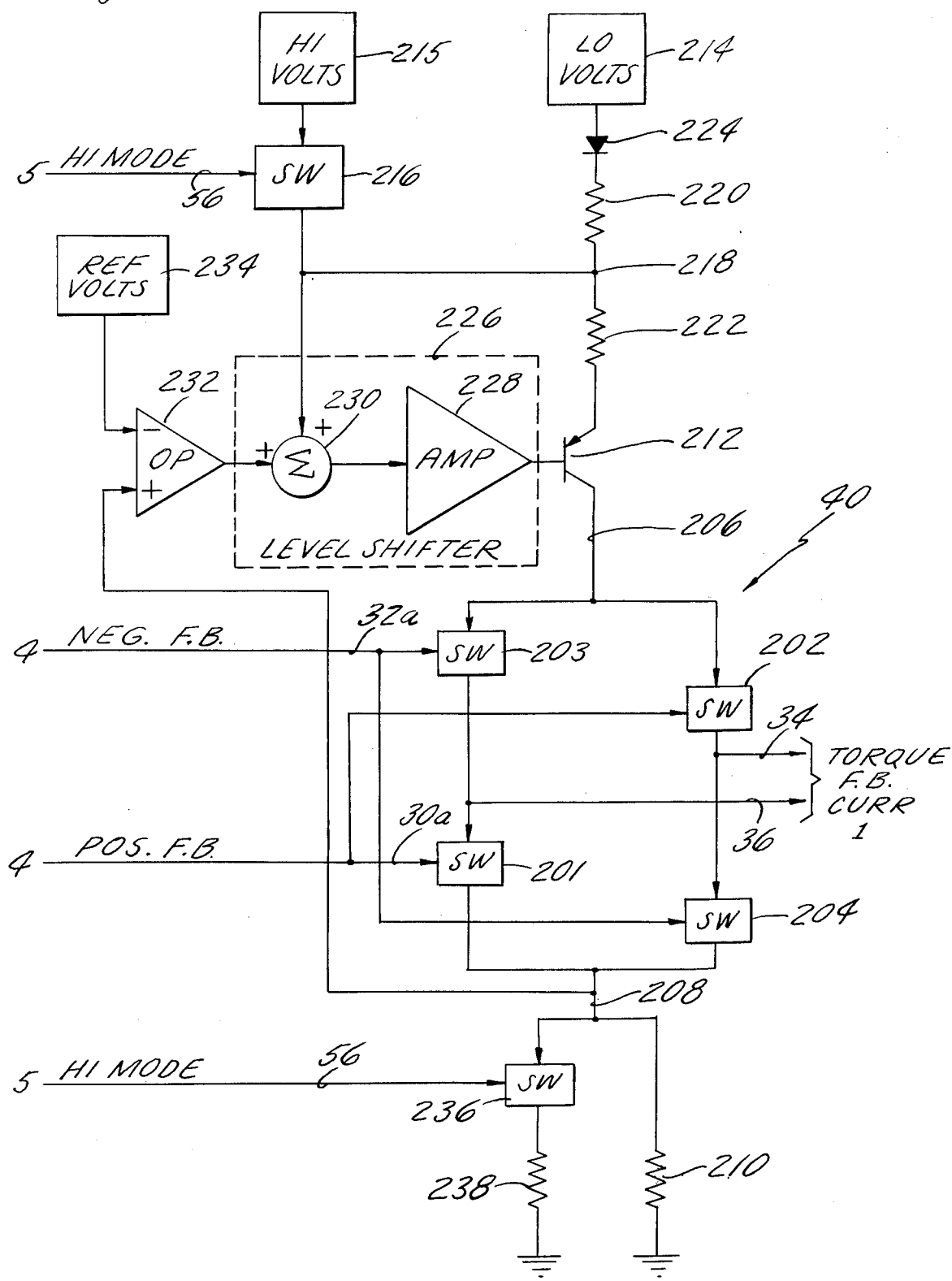

DUAL RANGE, TORQUE REBALANCING OF INERTIAL SENSOR

BACKGROUND OF THE INVENTION

1. Field of Invention

This invention relates to torque rebalancing of inertial sensors, and more particularly to a dual range torque rebalance feedback loop control apparatus and output integrator for use with torque rebalanced inertial sensors.

2. Description of the Prior Art

As is known, low drift, substantially error-free operation of inertial sensors, such as accelerometers and gyros, is enhanced by pulse torque feedback which electromagnetically drives the output axis of the sensor in a direction opposite to the motion induced by the inertial phenomenon (acceleration or angular rate) being sensed thereby. The signal output of the sensor is utilized to control feedback current applied to the torque rebalancing magnet winding, such that the output signal is reduced to substantially zero, and a signal proportional to the applied feedback is used as an output indication of the magnitude of the inertial parameter being sensed. In pulse torque rebalanced inertial sensor apparatus, there are important trade-offs between the dynamic range, resolution and accuracy, especially in gyro sensor loops. For high rates, the torque rebalancing feedback current must be increased in order to balance the higher forces relating to higher rates; but resolution and accuracy vary, in part, in proportion with torque rebalancing feedback current. Thus, resolution and accuracy are decreased when the system is designed to operate at high rates. But if the torque rebalancing feedback current is kept relatively small for good accuracy and resolution, the sensor loop will saturate at correspondingly lower rates. Stated alternatively, an inertial sensor, particularly a gyro, which must sense both low rates and high rates suffers the consequences of the errors which are nominally related to full scale (high rates) even at low ends of the scale (low rates).

Another problem, particularly in space applications, is that the power consumption and the size and weight of the power supplies necessary to operate a torque rebalanced inertial sensor loop is directly proportional to the maximum rate which can be sensed thereby. If high angular rates or accelerations need be sensed during maneuvering, so that a high capacity is provided, then there is a large power consumption all of the time, even when only low rates are being sensed. On the other hand, if the power consumption is maintained at a low level so as to handle only the low angular rates or acceleration which are encountered most of the time, then the sensor will saturate and not provide correct outputs during high-rate maneuvering.

SUMMARY OF THE INVENTION

An object of the present invention is to provide a fully automatic, dual range inertial sensor loop.

According to the present invention, in a system in which the output of an inertial sensor is used to generate a signal indicative of the magnitude of feedback current required to torque-rebalance the sensor, and to provide an output indication of the magnitude of the parameter being sensed, the improvement comprises automatically sensing high sensor output magnitudes to automatically shift from a low range mode to a high range mode, the torque-rebalancing feedback current being increased in the high range mode to a given multiple of the current in the low range mode, the output being generated in the high range mode being the same given multiple of the output which is generated in the low range mode. In further accordance with the invention, the difference in the high and low ranges automatically provide, by the same magnitude, high and low frequency clocks for output counting, high and low torque-rebalancing feedback current, and high and low ramp voltages for providing a timed indication of the sensor output magnitude. In accordance with one embodiment of the invention, shifting from the high range mode to the low range mode and from the low range mode to the high range mode is achieved at different output magnitudes, in the nature of hysteresis, to avoid oscillating between high range and low range modes. In further accord with an embodiment of the invention, shifting from one range mode to the other range mode may be in response to a time delay, so as to avoid mode switching for very short term gross changes in the inertial sensor output magnitude.

The present invention is readily implemented with technology which is available in the art. Although the invention is less accurate and consumes more power when in the high range mode, these effects are present only when absolutely necessary for sensing very high angular rates or accelerations, as the case may be. Since the operation is automatic, the processing circuitry (such as a computer), which utilizes the output of the inertial sensor employing the present invention in its feedback loop, does not have to accommodate any difference in the signals applied thereto, they at all times being indicative of the actual magnitude sensed by the sensor. The invention maintains constant loop gain and dynamics even as the torquing current changes in the different rate modes. The invention provides switching from the low rate mode to the high rate mode without loss of information due to saturation. The invention provides switching from the high rate mode to the low rate mode at an appropriate sensor output level without loop transients which could possibly retrigger transfer back into the high rate mode. The invention is illustratively described in conjunction with a rate gyro, but is equally usable with accelerometers.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

FIG. 4 is a schematic block diagram of an analog to pulsewidth modulation read-out circuit for use in the embodiment of FIG. 1;

FIG. 5 is a schematic block diagram of a mode control circuit for use in the embodiment of FIG. 1;

FIG. 6 is a simplified block diagram of an integrating output counter and controls therefore, for use in the embodiment of FIG. 1; and FIG. 7 is a schematic block diagram of a regulated torque rebalancing current source and current polarity selecting bridge for use in the embodiment of FIG. 1.

DESCRIPTION OF THE PREFERRED EMBODIMENT

Figure 1:
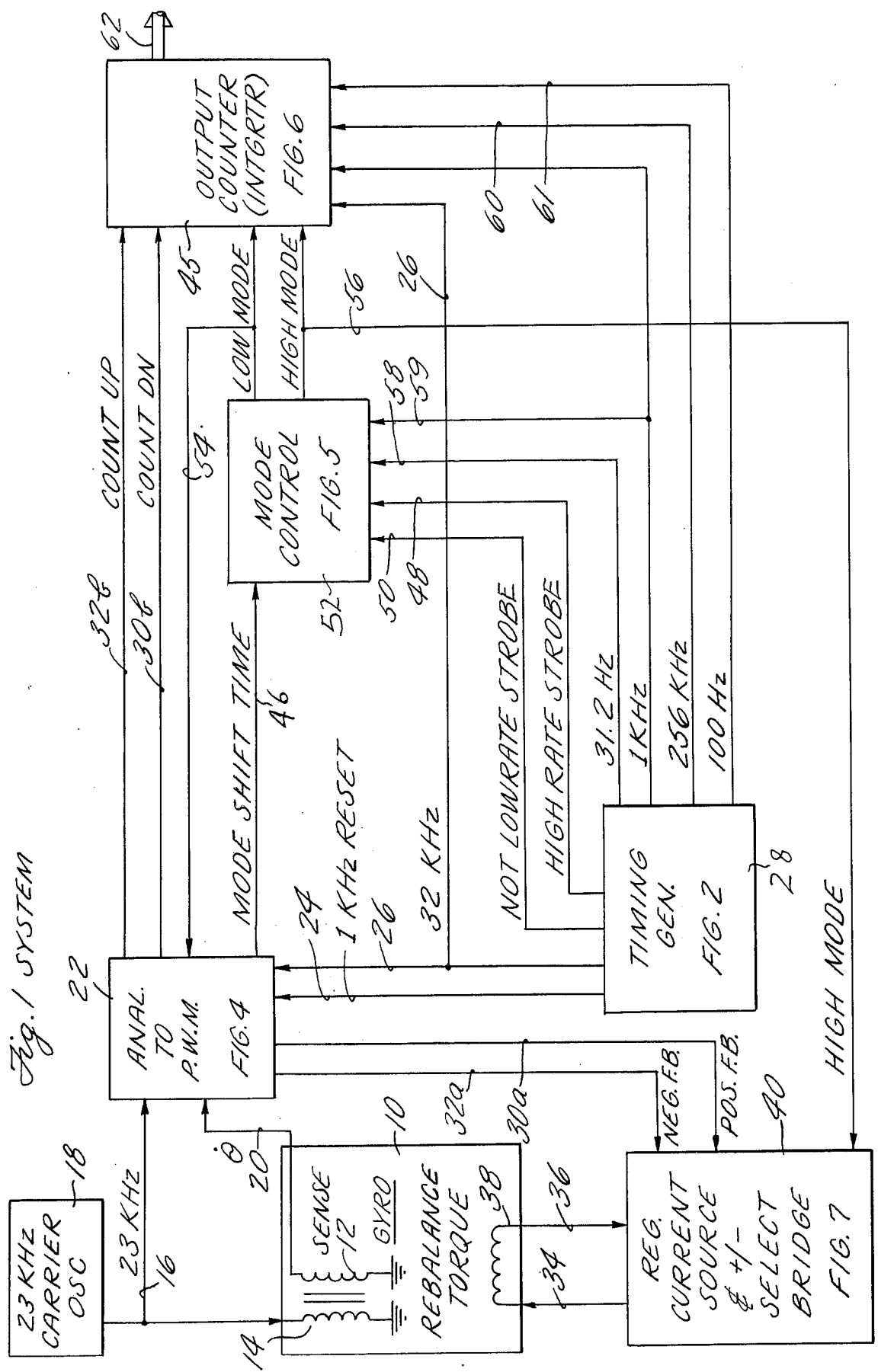
FIG. 1 is a schematic block diagram of a system incorporating the preferred embodiment of the present invention.

Referring now to FIG. 1, a system incorporating an exemplary embodiment of the present invention employs a rate integrating gyro 10 as the inertial sensor. As shown in FIG. 1, the gyro is a single axis gyro of the strapped-down variety (ungimballed), having a secondary winding 12 disposed to sense a varying amount of a carrier signal applied to a primary winding 14 coupled thereto, in proportion to any angular rate with respect to the input axis of the gyro. The carrier signal in the primary 14 may be provided in any suitable fashion, such as on a line 16 from a 23 KHz carrier oscillator 18. The output of the secondary 12 on a line 20 is a carrier signal whose magnitude is a function of angular rate sensed by the gyro. This signal is applied along with the carrier signal on the line 16 to an analog to pulsewidth modulation converter circuit 22, which is described more fully hereinafter with respect to FIG. 4, and which receives a 1 KHz reset signal on a line 24 and a 32 KHz signal on a line 26 from a timing generator 28, which is described more fully with respect to FIGS. 2 and 3 hereinafter. The circuit 22, in response to these timing signals, provides a ramp voltage which advances from maximum negative at the start at each 1 KHz cycle to maximum positive at the end of each cycle, which is compared against the magnitude of a signal indicative of angular rate derived from the signal on the line 20, successful comparisons in the first half of the cycle indicating negative rates and in the second half of the cycle indicating positive rates, early in the first half cycle indicating high negative rates and later in the first half cycle indicating lower negative rates, early in the second half cycle indicating lower positive rates and later in the second half cycle indicating higher positive rates. When the comparison occurs, the circuit 22 shifts from generating a positive feedback signal on a line 30a (to torque-rebalance negative rates) to generating a negative feedback signal on a line 32a (to torque-rebalance positive rates) thereby to control the polarity of current applied by lines 34, 36 to a rebalance torque winding 38 in the gyro 10, under the control of a regulated current source and +/− selection bridge 40, which is described more fully hereinafter with respect to FIG. 7. When a successful comparison is made, the circuit 22 also switches from generating a count-down signal on a line 30b to generating a count-up signal on the line 32b so that it transfers from integrating potentially negative rates in an output counter and integrator 45 (described more fully hereinafter with respect to FIG. 6) to integrating positive rates therein. The circuit 22 also provides in response to a successful comparison a mode shift time signal on a line 46 for comparing the angular rate indicated by the time of the successful comparison with a high rate strobe signal on a line 48 and a not low rate strobe signal on a line 50 in a mode control circuit 52 which is described more fully with respect to FIG. 5 hereinafter. If the timing indicated by the signal on the line 46 indicates a need to shift from one mode to the other, then the mode control will alter its operation as between providing a low mode signal on a line 54 and a high mode signal on a line 56. These signals control the magnitude of the ramp voltage in the circuit 22, the frequency of a clock signal which advances the output counter 45 and the magnitude of the torque rebalancing current provided by the regulated current source 40, as described briefly hereinbefore and more fully hereinafter. The timing generator 28 also provides, to the mode control 52 and the output counter 46, additional clock signals on lines 50–61 as is described more fully hereinafter. The output counter and integrator 45 provides a digital signal indicating an integrated angle on a trunk of 12 lines 62.

Figure 2:
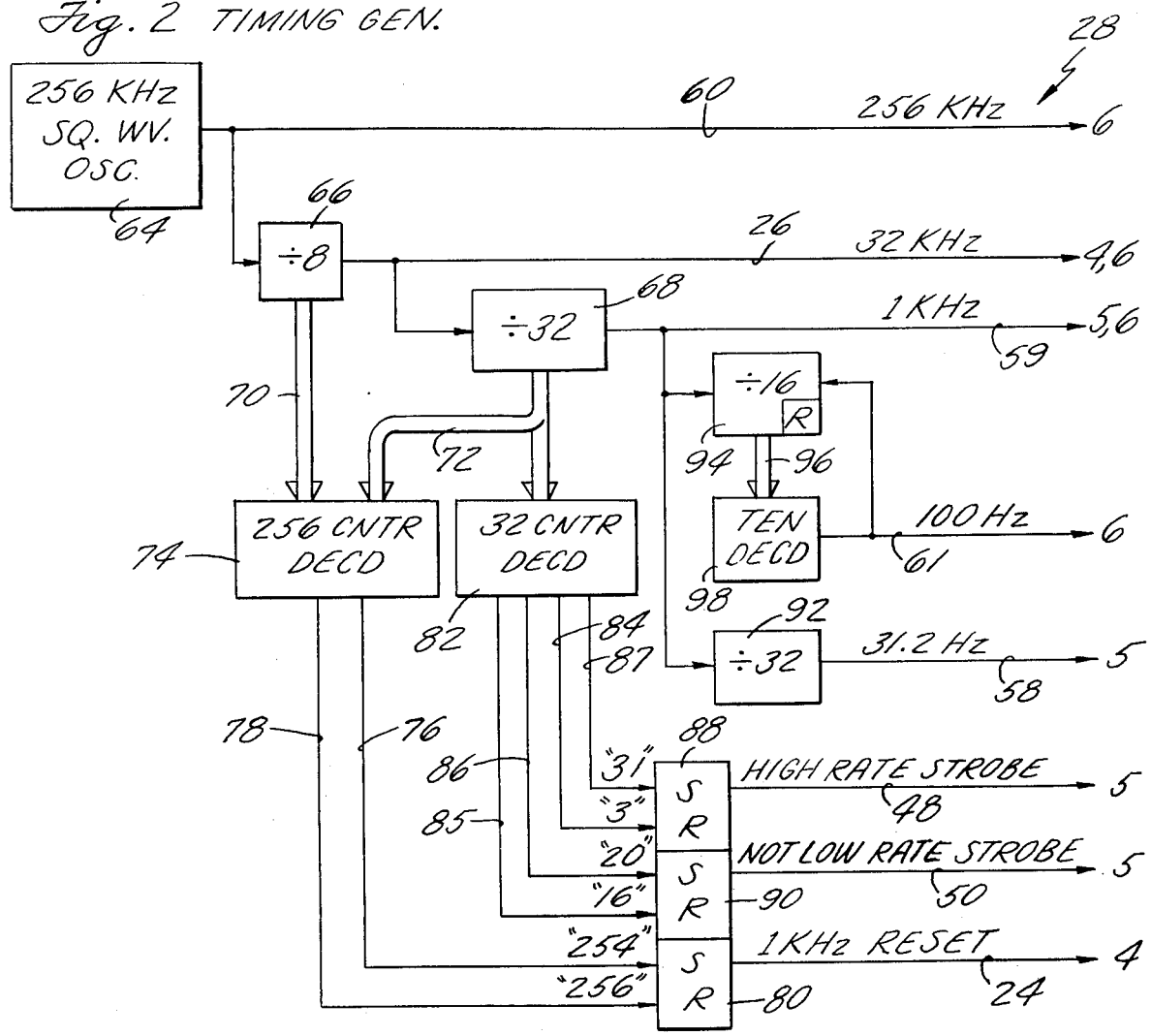
FIG. 2 is a simplified block diagram of a timing generator for use in the embodiment of FIG. 1.

Referring now to FIG. 2, an exemplary circuit, which of course may take a large number of other suitable forms, is shown for generating various clock and control signals for the system of the present embodiment. Specifically, a 256 KHz square wave oscillator 64 provides the 256 KHz clock signal on the line 60, and is also applied to a divide-by-8 circuit 66 (which may comprise a simple, three-stage binary counter) to provide the 32 KHz signal on the line 26. This is in turn applied to a divide-by-32 circuit 68 (which may be a simple, five-stage binary counter) to provide the 1 KHz signal on the line 59. The two counters 66, 68 can as well be thought of as a single eight-stage binary counter, so that the outputs thereof can be decoded to provide signals at particular times. Stages of the counters 66, 68 are applied by trunks of lines 70, 72 to a 256-counter-decode circuit 74 which decodes the 254th count, as indicated by a signal on a line 76, and decodes the 256th count as indicated by a signal on a line 78. These are used to respectively set and reset a bistable device such as a flip-flop or latch 80 to generate the 1 KHz reset signal on the line 24 as shown in illustrations (a) and (b) of FIG. 3. The outputs of all the stages of the divide-by-32 counter 68 are also applied to a 32-counter-decode circuit 82 to generate signals on a plurality of lines 84–87 respectively indicating counts of 2, 15, 18 and 31. The counts of 31 and 2 on the lines 87 and 84 are applied to a bistable device 88 to generate the high rate strobe signal on the line 48 as shown in illustration (e) of FIG. 3; the counts of 18 and 15 on the lines 86 and 85 are used to set and reset, respectively the bistable device 90 for generating the not low rate strobe signal on the line 50 as is shown in illustration (f) of FIG. 3.

Figure 3:
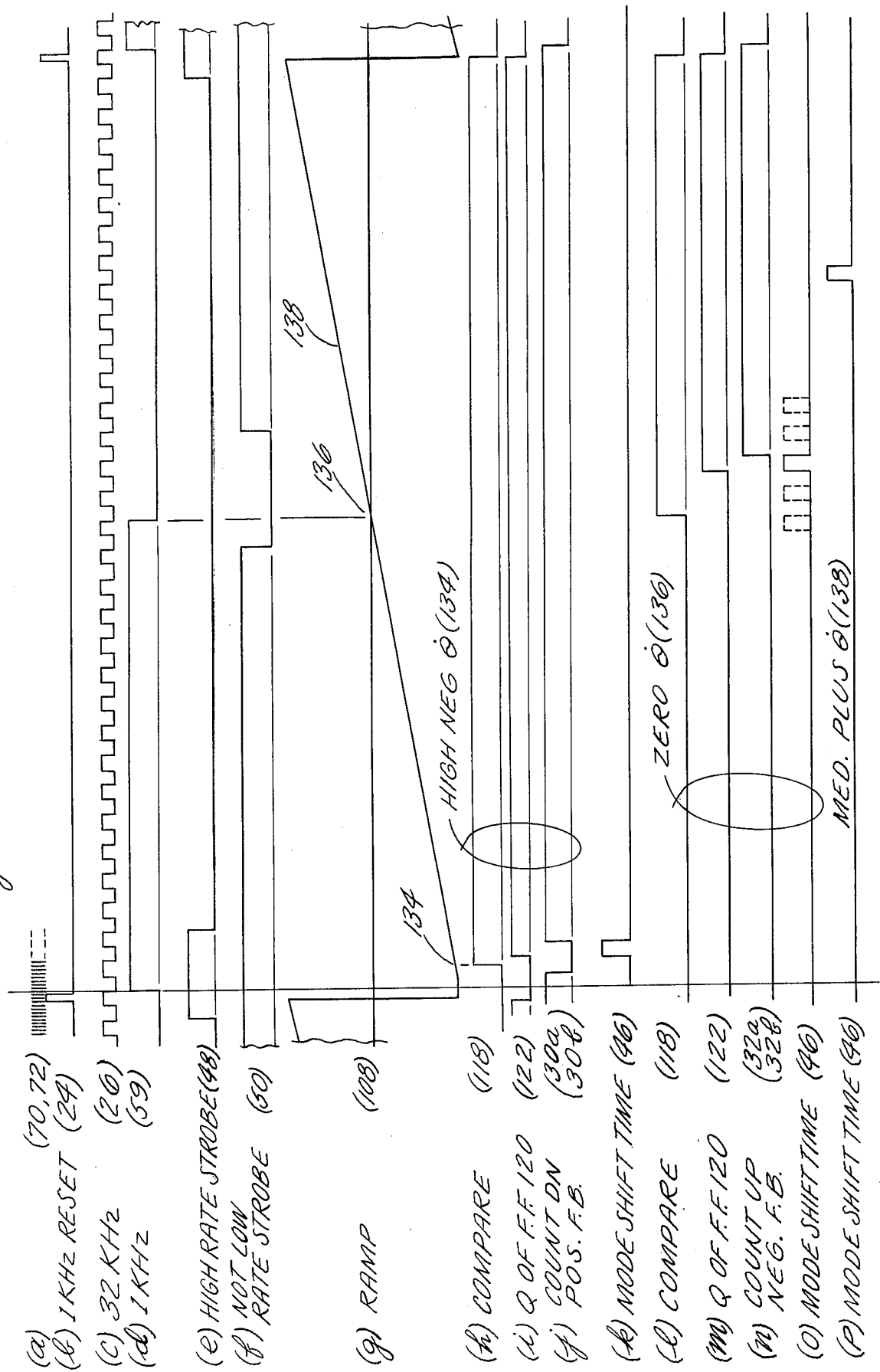
FIG. 3 is an illustration of the timing of circuit operation, on a common time base.

The 1 KHz signal on the line 59 is applied to a divide-by-32 counter so as to generate the 31.2 Hz signal on the line 58, which is not shown in FIG. 3 since it has a period 32 times greater than the time base illustrated in FIG. 3. The 1 KHz signal on the line 59 is also applied to a divide-by-16 counter 94, the outputs of which on a trunk of lines 96 are applied to a 10 decode circuit 98 which provides the 100 Hz signal on the line 61 and resets the divide-by-16 counter every time a count of 10 is reached. This signal is also not shown in FIG. 3 since it has a period 10 times greater than the time base illustrated in FIG. 3.

The manner of usage of the timing signals generated in FIG. 2 and illustrated thus far in FIG. 3 is described more fully with respect to the utilization thereof in the various circuits hereinafter.

Referring now to FIG. 4, the basic electronic sensing circuits comprise the analog to pulsewidth modulation converter circuit 22. The carrier signal on the line 20 having a magnitude indicative of an angular rate being sensed by the gyro 10 is applied in FIG. 4 to an AC amplifier 100, the output of which is applied to the signal input of a synchronous demodulator and filter circuit 102 which has at its reference input the 23 KHz carrier signal on the line 16. The output of the synchronous demodulator, applied through a resistor 104 to the non-inverting input of an operational amplifier 106, comprises a DC signal, the magnitude of which is a function of the angular rate being sensed by the gyro 10 (FIG. 1). The other input to the operational amplifier 106 (op amp) is connected through a resistor 108 to the output of a linear ramp voltage generator 110 which provides an output signal as is shown in illustration (g) of FIG. 3, and through a second resistor 112 and an electronic switch 114 to ground. When the electronic switch 114 (which may comprise a field effect or bipolar transistor) is actuated by the presence of a low mode signal on a line 116, it causes the resistor 112 to be in the circuit with the resistor 108, cutting the magnitude of the signal applied from the ramp generator 110 through the resistor 108 to the op amp 106 to ⅛ of its normal value, for purposes described hereinafter. The low mode signal on the line 116 is generated in a manner described with respect to FIG. 5 hereinafter. The ramp voltage generator 110 is caused to be reset just prior to the start of each 1 KHz cycle by the 1 KHz reset signal on the line 24. The op amp is simply a very high gain amplifier having the characteristic that when the inverting input (the ramp) is more positive than the non-inverting input (the incoming signal) there is an output from the op amp, a very slight voltage difference being sufficient to cause saturation of the op amp, so that it operates as a comparator.

Whenever a comparison is made (that is, at the point in time when the ramp voltage is equal to the input voltage) the op amp 106 provides a signal on a line 118 to the J input of a JK flip-flop 120 so that the next negative transition of the 32 KHz signal on the line 26 will cause the flip-flop 120 to be set so that its Q output on a line 122 will enable another flip-flop 124 so that the next negative transition on the line 126 from an inverter 128 (equivalent of the positive transition of the 32 KHz signal on the line 20) will cause the flip-flop 124 to end the signal of its NOT Q output on the lines 32a, 32b and present its Q output on the lines 30a, 30b. Because of the clocking of the flip-flops 120, 124, the high rate and not low rate strobes of illustrations (e) and (f) are delayed by the period of one 32 KHz cycle. The mode shift time signal on the line 46 is generated by an OR circuit 130 in response to an AND circuit 132 in dependence upon the concurrence of a signal on the line 22 from the Q output of the flip-flop 120 and a signal on the lines 32a, 32b from the not Q output of the flip-flop 124 which gives it a pulsewidth one-half of the period of the 32 KHz signal.

The foregoing operation is shown in illustrations (h)-(k) of FIG. 3 for the case where the angular rate is a high negative value, in excess of 15/16 of the maximum possible negative value (of the particular range, high range or low range as the case may be) as indicated by the point 134 in illustration (g) of FIG. 3. Comparison of the mode shift time signal of illustration (k) with the high rate strobe signal of illustration (e) in FIG. 3 shows that if the apparatus were operating in the low range mode when sensing a rate that provides a voltage magnitude at the point 134 of illustration (g), coincidence with the high rate strobe would thereafter cause shifting into the high rate mode, as is described more fully hereinafter.

The foregoing operation is illustrated with respect to a zero angular rate (point 136, illustration (g)) being sensed in illustrations (l)-(o) of FIG. 3. Illustration (o) also shows in dotted lines other mode shift times which would fall within the not low rate strobe of illustration (f). And, the medium positive rate of point 138 (illustration (g) of FIG. 3) is shown causing a mode shift time signal in illustration (p).

Referring again to FIG. 4, the mode shift signal on the line 46 can also be generated by the OR circuit 130 in response to either of two other AND circuits 140, 142. The AND ciruict 140 handles the situation (illustration (g) of FIG. 3) where the rate is so high that no comparison is ever made, and a mode shift signal is required so that if the circuitry is operating in the low mode it can shift to the high mode. Thus whenever reset occurs without the flip-flop 124 having been set, the AND circuit 140 will cause the OR circuit 130 to generate the mode shift time signal on the line 46. The AND circuit 142, on the other hand, accommodates rates which are maximum or in excess of maximum in the negative direction. This is a slightly different situation. If the rate is more than maximum negative, the compare circuit 106 will supply an output during the reset time (to the left of FIG. 3) causing the flip-flop 120 to be set at the start of the 1 KHz signal (illustration (d) of FIG. 3), but the next half of the 32 KHz clock signal from the inverter 128 will not yet have caused the flip-flop 124 to be reset, and it never can, since the flip-flop 120 has already been set again. Thus there will be no time when the flip-flop 120 is set and the flip-flop 124 is reset so as to operate the AND circuit 132 in the manner described in the preceding paragraphs. By taking the output directly from the compare circuit 106, if the compare circuit has an output during reset time, the AND circuit 142 will cause the OR circuit 130 to generate the mode shift time signal on the line 46.

Referring now to FIG. 5, the mode control circuit 52 generates the low mode signal on the line 54 in response to a JK flip-flop 154 being in the set state, and generates the high mode signal on the line 56 whenever the flip-flop 154 is in the reset state. The flip-flop 154 in turn follows a similar JK flip-flop 156 once in each cycle, since it is clocked by the 1 KHz clock signal on the line 59. The flip-flop 156 in turn is controlled by the two high order stages of a counter 158 which in turn is advanced by the 31.2 Hz clock signal on the line 58. The counter simply operates as a timing circuit and its purpose is to not recognize low rates which occur for only very short intervals of time, incidentally, during various maneuvers. The low rate is, instead, intended for use during long periods of low-maneuver flight or the like. The time delay of the counter may be as low as a fraction of a second, in some uses of the invention; this delay is, of course, easily varied by proper selection of the number of stages in the counter 158 and the frequency of clock signals applied thereto. As described with respect to FIG. 3 hereinbefore, if the mode shift time signal on the line 46 is sensed near the center of the ramp, when the not low rate strobe signal on the line 50 is low, then a mode shift into the low mode should occur. However, it should not occur unless a low rate is sensed consistently for the period of time established by the counter. The counter will count to its highest order and then switch the JK flip-flop 156 into its set state so as to provide a signal from its Q output thus to set the flip-flop 154, unless the counter is reset periodically by a mode OK signal on a line 160 which is developed by an AND circuit 162 as a consequence of not low rate strobe signal on a line 50 being positive (illustration (f) of FIG. 3) concurrently with the mode shift time signal on the line 46. The resetting of the counter by the signal on the line 160 causes it to start counting all over again, which will occur whenever the rate is medium or high, but will not occur whenever the rate is low. Since the counter is advanced by a 31.2 Hz clock signal on the line 58, if it has seven stages it will count for 4.3 seconds after being reset before it issues a signal to the JK flip-flop 156; on the other hand, if it has six stages it will take 2.1 seconds after being reset before it will set the JK flip-flop 156. The highest order of the counter is connected to the J input of the flip-flop and the next lower order is connected to the clock input of the flip-flop, so the J input is enabled at half of the maximum count of the counter and the clock signal appears at the full count of the counter. At any other time when the second order of the counter advances, because the K input is grounded, and the J input would then be low, clocking of the flip-flop 156 will have no effect (since both inputs are low), as is well known.

Any time that a high rate is sensed during the high rate strobe, the concurrence of the mode shift time signal on the line 46 together with the high rate strobe signal on the line 48 will cause an AND circuit 164 to issue a shift into high signal on a line 166 which automatically resets the JK flip-flop 156 so as to shift into the high mode.

The output counter and integrator 45 provides the output of the system, consisting of a digital word on the trunk of twelve lines 62, in response to twelve stages of an up/down counter 172, the frequency of counting of which (high or low) is controlled by a pair of gates 173, 174 and the sense of counting of which (down or up) is controlled by a pair of gates 175, 176. The AND gate 175 may provide count down signals on a line 178 during the first half of each 1 KHz cycle due to the presence of the 1 KHz clock signal on the line 59 concurrently with the presence of the countdown signal on the line 30b, and the AND gate 176 may provide count up signals on a line 179 during the second half of each 1 KHz cycle due to an inverter 180 which is responsive to the 1 KHz clock signals on the line 59, whenever the count up signal is present on the line 32b. The rate of the count up or count down signals on the lines 178, 179 is determined by output clock signals on a line 182 which are presented by an OR circuit 184 in response to either one of the gates 173, 174 being operated. When in the low mode, the presence of the low mode signal on the line 54 will cause the AND gate 173 to pass 32 KHz clock signals on the line 26 through the OR circuit 184 to operate the up/down counter 172; whenever the circuit is in the high mode, the presence of the high mode signal on the line 56 will cause the 256 KHz clock signals on the line 60 to pass through the AND circuit 174 through the OR circuit 184 to advance the up/down counter 172. The up/down counter integrates the angular rates over ten cycles, as determined by a reset signal on a line 186 generated by a delay circuit 188 in response to the 100 Hz signal on the line 61; the 100 Hz signal on the line 61 may be applied to the processor which utilizes the information for navigational purposes to indicate to it that it may sample the trunk of 12 lines 62 so as to get an indication of the angle traversed during the ten cycle integration period, just before the signal on the line 186 resets the up/down counter 172. Other arrangements may, of course, be made to accommodate sensing the full integrated count in the up/down counter 172 before it is reset at the end of its integration period; also, different integration periods may be chosen in dependence upon the utilization to which the present invention is to be put, as should be obvious to those skilled in the art.

Referring now to FIG. 7, the torque rebalancing of the gyro, as described hereinbefore, is accomplished by current applied to the torque rebalance winding 38 (FIG. 1) of the gyro 10 over a pair of lines 34, 36, under the control of the regulated current source and +/− select bridge 40. The +/− select bridge consists of a plurality of electronic switches 201–204, a pair of which are operable at a time in dependence upon the presence of the positive feedback signal on the line 30a or the negative feedback signal on the line 32a, alternatively. In response to the positive feedback signal on the line 30a, the regulated current in a line 206 will pass through the switch 202, along the line 34, through the rebalance winding 38 (FIG. 1) and back over the line 36, through the switch 201, and through a line 208 and a current sensing resistor 210 to ground. Alternatively, in response to the negative feedback signal on the line 32a, the bridge will cause the current to pass from the line 206 through the switch 203, the line 36, the winding 38, the line 34, the switch 24, the line 208, and the resistor 210 to ground. The magnitude of the current applied to rebalance the gyro is determined by a current regulating transistor 212 which in turn is responsive to one or both of a pair of voltage sources 214, 215. When not in the high mode, a switch 216 renders the high voltage source 215 out of the circuit so that only the low voltage source 214 is in the circuit. But when the high mode signal is present on the line 56, the switch 216 operates providing the high voltage of the source 215 to a junction 218 between a pair of resistors 220, 222. The resistors 220, 222 operate in conjunction with the transistor 212 to regulate the current in the line 206, in a well known fashion; the resistor 220 being above the junction 218 provides additional gain to the regulation by the transistor 212 when working from the low voltage source 214, so the loop gain is the same in either mode. A rectifier 224 prevents the high voltage source from leaking into the low voltage source 214 when in the high mode. Additionally, a level shifter 226, consisting of an amplifier 228 having a summing junction 230, changes the operating level of the transistor 212 as between the low mode and the high mode. When in the low mode, the transistor 212 operates in response to the amplifier 228 which in turn is responsive only to an operational amplifier 232 which operates as a compare circuit to compare the voltage indication of current developed across the resistor 210 with the reference voltage of a reference voltage source 234.

Additionally, when in the high mode, the presence of the high mode signal on the line 56 actuates an electronic switch 236 (bottom of FIG. 7) which provides a second resistor 238 in parallel with the first resistor 210 which causes the total resistance from the point 208 to ground to be 1/n of the resistance of the resistor 210, where n is the ratio of the current applied to torque rebalance the gyro when in the high mode vs. the current applied to the gyro when in the low mode. Thus it is that the regulated current source and +/− select bridge 40 of FIG. 7 controls the direction of current through the torque rebalance winding, controls whether high current or low current is fed therethrough, and also regulates the current (whether it be high or low) in both modes. As is known, because of the mechanical inertia of a gyro or accelerometer, it will not fully respond to the torque rebalancing feedback current in any one of the 1 KHz cycles. Thus, although full feedback current (either low or high, depending on the mode) is applied in one direction for some portion of a cycle, the opposite feedback may also be applied during the same cycle (in the case of a zero rate, the feedback is in each direction for a full half cycle), and these will fully cancel over the full cycle with negligible effect on the inertial sensor. It is only net rates and net feedback (mostly plus or mostly minus) over many cycles that affect the inertial sensor.

The present invention thus provides apparatus for torque rebalancing a gyro in either a high mode or a low mode, the torque rebalancing being pulsewidth modulated, current average torquing such that positive torque feedback is applied until the gyro output compares with a linear ramp, following which negative torque feedback is applied; when zero angular rate is being sensed, positive feedback is applied for half of each cycle, and the comparison is made in mid-cycle, so then negative feedback is applied for half of each cycle, such that the average torque feedback applied during each cycle is zero. In a somewhat different fashion, an integrating output counter counts negatively during the first half of a cycle after the output of the rate gyro compares with the linear ramp; or it counts positively during the second half of each cycle until the output of the rate gyro compares with the linear ramp; when a zero angular rate is being sensed, the counter is not counted at all, giving an integration of zero during the cycle. In addition, in accordance with the invention, this action is achieved at either a high rate or a low rate, depending upon whether the gyro is sensing high rates or low rates. When sensing low rates, a low torque rebalancing current is applied to the gyro in the fashion described hereinbefore and a low clock rate is used to count the up/down counter; when high rates are being sensed, a high current is used for torque rebalancing the gyro, and a high clock rate is used for counting the up/down counter; the high rate mode or low rate mode is automatically selected as necessary. The processor which receives the output of the present invention for navigational computations neither knows or cares whether the present invention is operating in the low rate mode or the high rate mode.

In addition, the present invention provides automatic shifting between the high rate and the low rate on a cycle-by-cycle basis, subject to the hysteresis provided by the fact that the counter 158 in FIG. 5 will not allow shifting from the high rate mode into the low rate mode unless a low rate is maintained for the number of seconds equivalent to the maximum count of the counter, and further provided by the fact that the high rate strobe (illustration (e) FIG. 3) is narrower than the negative portion of the not low rate strobe (illustration (f) of FIG. 3). Thus, when sensing a low rate by falling within the negative portion of the not low rate strobe in the middle of FIG. 3, the device will shift into the low rate eventually, but when it does so it should not then provide such a high rate in the low rate mode that it shifts right back to the high rate again; therefore, the high rate strobe is more than $n$ times greater than the extent of the negative portion of the not low rate strobe, where $n$ is the ratio of difference between the high and low rates. In the present embodiment, the difference between the high rate and the low rate is defined by the balance of circuitry in FIG. 7 which defines the difference in current between the high and low rates, and in the example given, this is 8:1 as is seen by the 8:1 ratio of a clock signal rates (250 KHz vs. 32 KHz) used for driving of the up/down counter 172 in FIG. 6. However, other ratios may be chosen as desired.

The present invention will shift from the low rate mode to the high rate mode in one cycle (one of the KHz clock signals shown in illustration (d) in FIG. 3). This is necessary because when rates are increasing, the gyro will saturate if the mode isn't shifted from the low rate mode to the high mode so as to get the high torque rebalance currents in FIG. 7. On the other hand, when in the high mode and a low rate is sensed, shifting immediately to the low rate mode is not necessary, since the low mode is used mainly for accuracy in sensing very small changes occurring over long periods of time in substantially straight flight, and to conserve power (low torque current) over long periods of time. It is also preferrable to reduce the number of switchovers due to the shifting between high and low torque currents.

Instead of adjusting the ramp voltage of FIG. 4 to high and low peak values, the gain of the signal processing (102, 104) could be adjusted, and the ramp could remain of fixed peaked magnitude.

Thus although the invention has been shown and described with respect to a preferred embodiment thereof, it should be understood by those skilled in the art that the foregoing and various other changes, omissions and additions may be made therein and thereto without departing from the spirit and the scope of the invention.

Having thus described a typical embodiment of our invention, that which we claim as new and desire to secure by Letters Patents is:

1. Apparatus for use with a torque rebalanced inertial sensor having a torque rebalance winding which restores the position of the sensor against inertial forces acting thereon in response to currents thereto, and providing an output signal indicative of inertial changes being sensed thereby, comprising:

mode control means settable into either one of two stable states and presenting either a high rate mode signal or a low rate mode signal, alternatively, for respectively designating a high rate sensing mode or a low rate sensing mode;

converter means responsive to the output signal of the inertial sensor for providing signal manifestations of the direction and the magnitude of the inertial changes being sensed thereby;

means responsive to said converter means and to said mode control means to provide output signals as a function of said signal manifestations of said converter means in respective dependence on said mode signals;

feedback current means responsive to said mode control means and said converter means operable to alternatively provide negative feedback current of either a first magnitude or a second magnitude depending on said mode signals, said first magnitude being an integral multiple of said second magnitude, in either of two polarities in dependence on said signal manifestations of said converter means, to the torque rebalance winding of the inertial sensor; and means responsive to the magnitudes represented by said signal manifestations of said converter means for correspondingly setting said mode control means into one or the other of said states, alternatively.

2. Apparatus according to claim 1 wherein said converter means is also responsive to said mode control means to provide said signal manifestation as a function of the output signal of the inertial sensor in respective dependence on said mode signals.

3. Apparatus according to claim 1 wherein said feedback current means comprises a plurality of current switches arranged as a polarity switching bridge, a first group of said switches being operable in response to said signal manifestation representing a first direction and a second group of said switches being alternatively operable in response to said signal manifestation representing a second direction.

4. Apparatus according to claim 1 wherein said feedback current means comprises a normally operative low voltage source feeding a current control transistor in series with the torque rebalance winding, together with a normally connected current sensing resistor connected in series with the torque rebalance winding, the voltage developed across said current sensing resistor being fed back to control said current regulating transistor;

a high voltage source, said high voltage source having a voltage which is substantially said integral multiple of the voltage of said low voltage source, said high voltage source being connectable to said current regulator transistor in response to said high rate mode signal; and a second current sensing resistor selectively connected in parallel with said first current sensing resistor in response to said high rate mode signal, the resistance of said normally connected current sensing resistor being substantially said integral multiple of the resistance of said second current sensing resistor.

5. Apparatus for use with a torque rebalanced inertial sensor having a torque rebalance winding which restores the position of the sensor against inertial forces acting thereon in response to currents applied thereto, and providing an output signal indicative of inertial changes being sensed thereby, comprising:

timing means providing a plurality of related, cyclic timing signals, including first and second timing signals, said first timing signals having a frequency which is an integral multiple of said second timing signals;

mode control means settable into either one of two stable states and presenting either a high rate mode signal or a low rate mode signal, alternatively, for respectively designating a high rate sensing mode or a low rate sensing mode;

converter means responsive to the output signal of the inertial sensor for providing a signal manifestation of the direction and the magnitude of the inertial changes being sensed thereby;

an up/down counter;

means responsive to said timing means, said converter means, and said mode control means to apply to said up/down counter either said first timing signals in response to said high rate mode signal or said second timing signals in response to said low rate mode signal, to count said counter up or down in respective dependence on said signal manifestation of said converter means;

feedback current means responsive to said mode control means and said converter means operable to alternatively provide negative feedback current of either a first magnitude or a second magnitude depending on said mode signals, said first magnitude being said integral multiple of said second magnitude, in either of two polarities in dependence on said signal manifestation of said converter means, to the torque rebalance winding of the inertial sensor; and means responsive to said converter means for setting said mode control means into one of said states.

6. Apparatus according to claim 5 wherein said timing means provides a cyclic series of cycle control signals at a frequency which is a sub-multiple of said second timing signals, said cycle control signals defining the first half and the second half of each cycle, and wherein said converter means comprises:

means providing a linear ramp voltage, said ramp voltage representing negative directions of the inertial sensor during the first half of each cycle and representing positive directions of the inertial sensor in the second half of each cycle;

means for converting the output of the inertial sensor to a DC voltage the magnitude of which is a function of the direction and the magnitude of the inertial changes being sensed thereby; and comparison means for comparing said DC voltage with said linear ramp voltage and providing said signal manifestation in response to said DC voltage exceeding the magnitude of said ramp voltage.

7. Apparatus according to claim 6 wherein said converter means is further responsive to said mode control means to provide said linear ramp voltage with either a first peak magnitude or a second peak magnitude which is said integral multiple of said first peak magnitude, in dependence on said mode signals.

* * * * *